United States Patent
Tanabe et al.

(10) Patent No.: US 9,335,577 B2
(45) Date of Patent: May 10, 2016

(54) DISPLAY DEVICE AND COVER MEMBER

(71) Applicant: Japan Display Inc., Minato-ku (JP)

(72) Inventors: Atsushi Tanabe, Tokyo (JP); Ken Hirabayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 143 days.

(21) Appl. No.: 14/022,536

(22) Filed: Sep. 10, 2013

(65) Prior Publication Data

US 2014/0078415 A1   Mar. 20, 2014

(30) Foreign Application Priority Data

Sep. 14, 2012 (JP) ................................. 2012-202534

(51) Int. Cl.
*G02F 1/1333* (2006.01)
*G02F 1/1335* (2006.01)

(52) U.S. Cl.
CPC ...... *G02F 1/13338* (2013.01); *G02F 1/133308* (2013.01); *G02F 1/133509* (2013.01); *G02F 1/133512* (2013.01); *G02F 1/133514* (2013.01); *G02F 2001/133331* (2013.01); *G02F 2202/28* (2013.01); *G02F 2203/055* (2013.01)

(58) Field of Classification Search
CPC .................... G02F 1/133509; G02F 1/133512; G02F 1/133514; G02F 2001/133521; G02F 2001/133331
USPC .......... 349/110, 104–106, 109; 430/7; 216/11
See application file for complete search history.

(56) References Cited

U.S. PATENT DOCUMENTS

| | | | | |
|---|---|---|---|---|
| 2009/0257010 A1* | 10/2009 | Sakurai | ......................... | 349/110 |
| 2009/0290113 A1* | 11/2009 | Nakahata et al. | ............. | 349/138 |
| 2011/0134378 A1* | 6/2011 | Tsuboi et al. | .................. | 349/110 |
| 2011/0260989 A1* | 10/2011 | Tho et al. | ........................ | 345/173 |
| 2012/0019817 A1* | 1/2012 | Tanabe | ......................... | 356/239.1 |
| 2012/0235048 A1* | 9/2012 | Kim et al. | ...................... | 250/372 |
| 2013/0083272 A1* | 4/2013 | Tanabe et al. | ................... | 349/96 |
| 2013/0308075 A1* | 11/2013 | Watanabe | ........................ | 349/61 |

FOREIGN PATENT DOCUMENTS

| | | |
|---|---|---|
| CN | 101231563 A | 7/2008 |
| CN | 102087436 A | 6/2011 |
| CN | 102667893 A | 9/2012 |
| JP | 2009-98324 | 5/2009 |

(Continued)

OTHER PUBLICATIONS

U.S. Appl. No. 14/022,471, filed Sep. 10, 2013, Tanabe, et al.

(Continued)

*Primary Examiner* — Michael Caley
*Assistant Examiner* — Jia Pan
(74) *Attorney, Agent, or Firm* — Oblon, McClelland, Maier & Neustadt, L.L.P.

(57) ABSTRACT

According to one embodiment, a display device includes a display module including a display area which displays an image, a cover member including a transmissive portion opposed to the display area, a first color portion opposed to a peripheral area on an outside of the display area of the display module, and a second color portion located on an outside of the first color portion, and a photosensitive resin which adheres the display module and the cover member to each other, wherein the first color portion has a higher transmittance of light of a wavelength for curing the photosensitive resin than the second color portion.

13 Claims, 7 Drawing Sheets

(56) References Cited

FOREIGN PATENT DOCUMENTS

| | | |
|---|---|---|
| JP | 2009-192792 A | 8/2009 |
| JP | 2009-251550 A | 10/2009 |
| JP | 2011-138099 A | 7/2011 |
| JP | 2011-203310 A | 10/2011 |
| JP | 2012-113228 A | 6/2012 |

OTHER PUBLICATIONS

U.S. Appl. No. 14/104,532, filed Dec. 12, 2013, Tanabe, et al.
Office Action issued on Nov. 17, 2015 in Japanese Patent Application No. 2012-202534 with English translation.
Office Action issued Nov. 23, 2015 in Chinese Patent Application No. 201310418217 (with English translation).

* cited by examiner

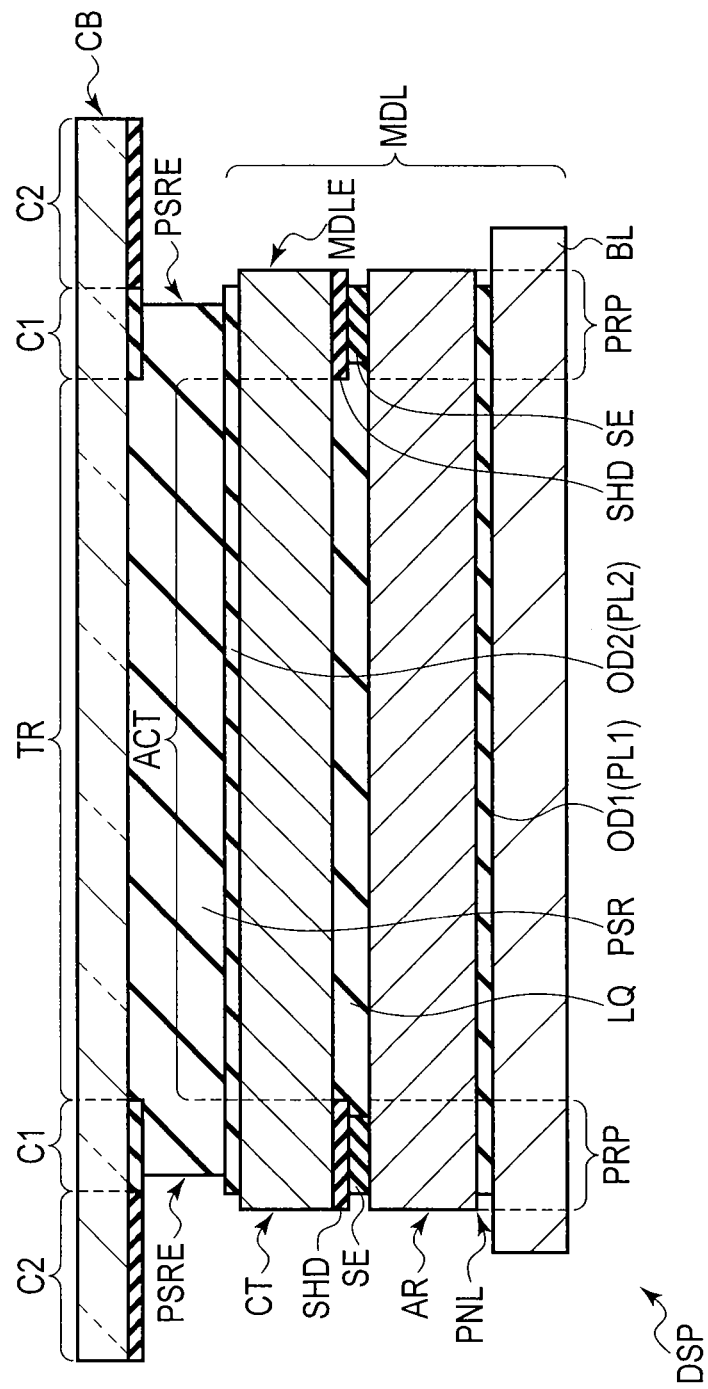
F I G. 2

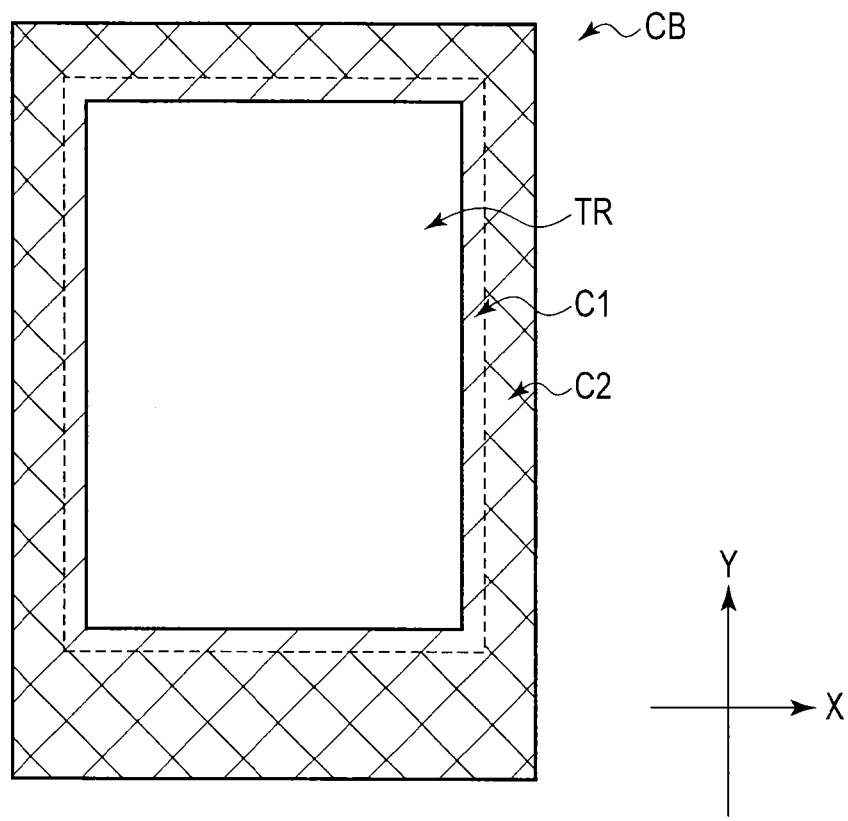
F I G. 3
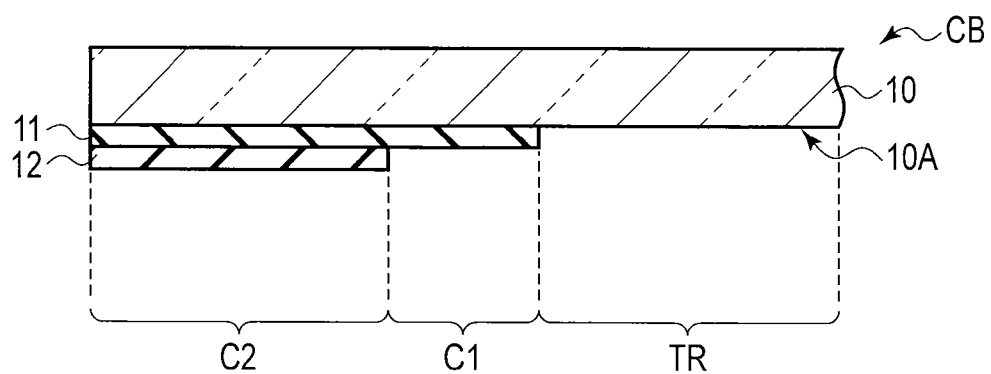
F I G. 4

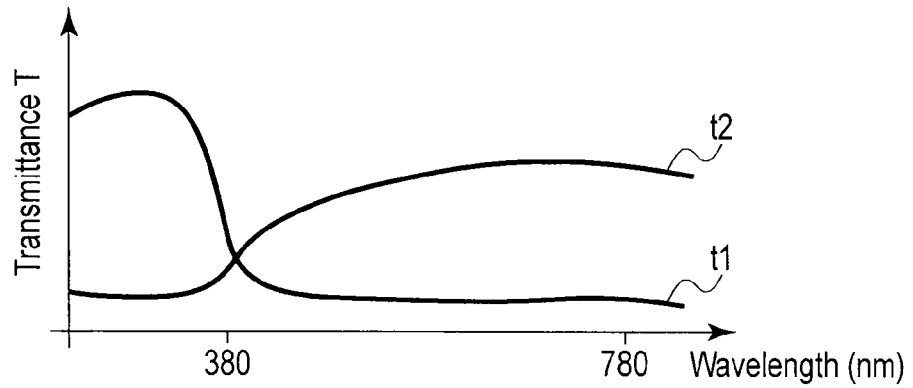
F I G. 5
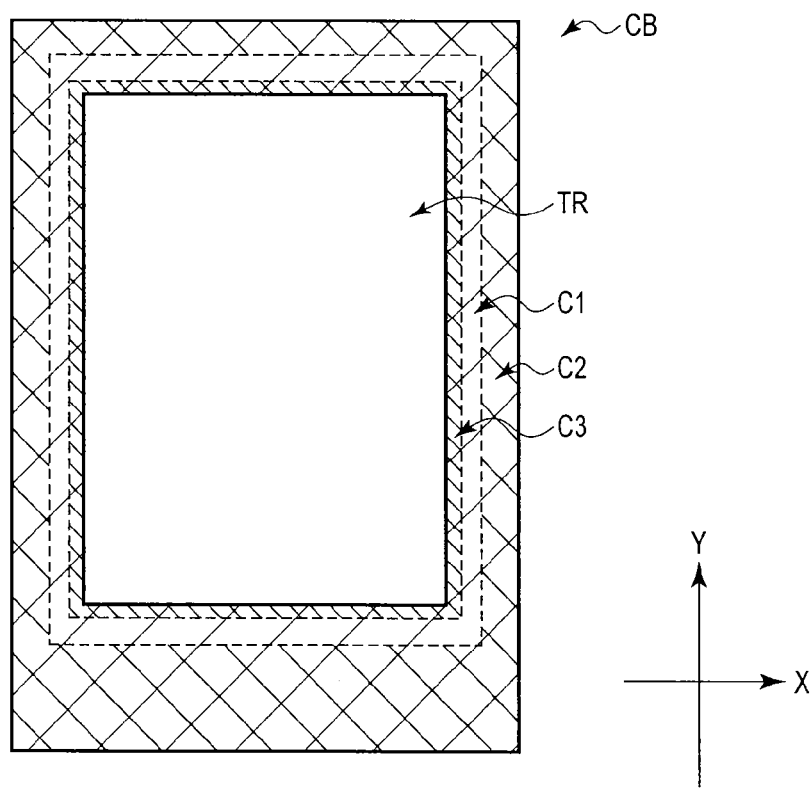
F I G. 6

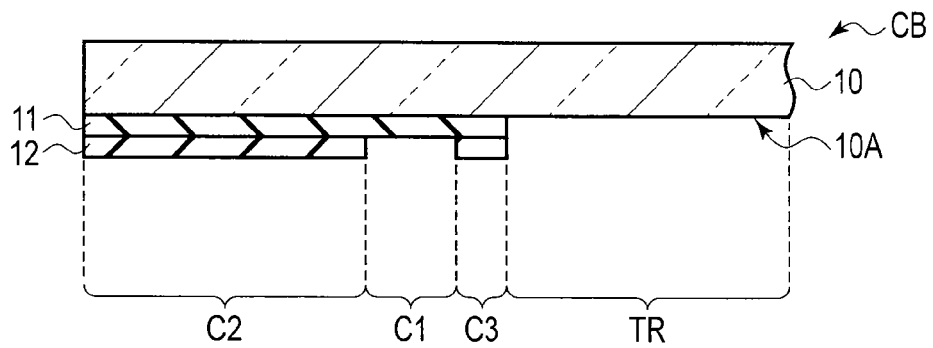
F I G. 7
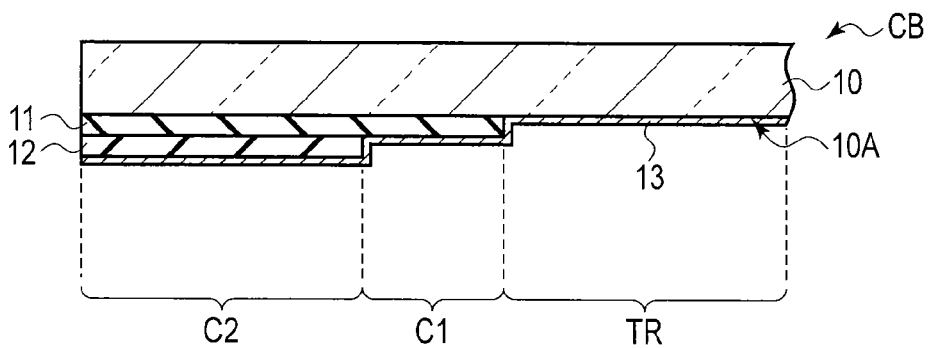
F I G. 9
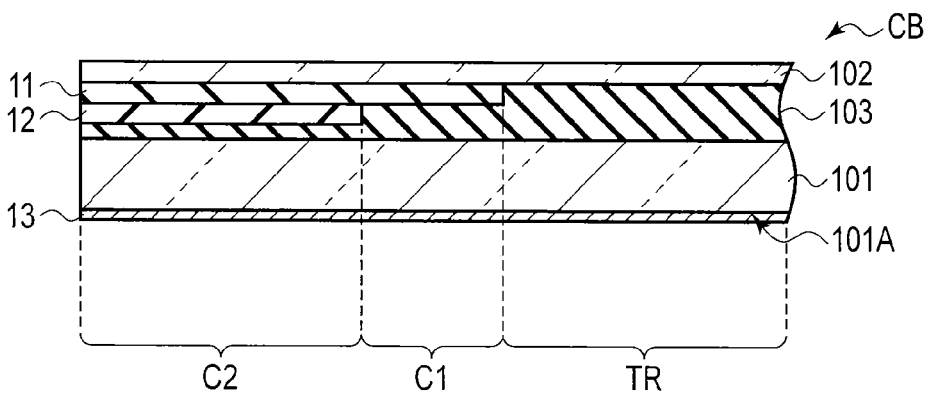
F I G. 10

DISPLAY DEVICE AND COVER MEMBER

CROSS-REFERENCE TO RELATED APPLICATIONS

This application is based upon and claims the benefit of priority from Japanese Patent Application No. 2012-202534, filed Sep. 14, 2012, the entire contents of which are incorporated herein by reference.

FIELD

Embodiments described herein relate generally to a display device and a cover member.

BACKGROUND

In recent years, from the standpoint of ecological aspects such as saving in space and power, commercial products, which adopt liquid crystal panels or organic electroluminescence (EL) panels as display devices, have been gaining in popularity, as typified by liquid crystal monitors, liquid crystal televisions, mobile phones, smartphones, tablets, electronic books, and notebook-type personal computers. In particular, in various kinds of electronic devices such as smartphones, tablets, electronic books and mobile phones, use is made of touch panels which can input position information by touching on screen surfaces thereof with use of fingers or the like, and cover glasses which cover outer peripheral parts other than screen display parts, as well as the display panels such as liquid crystal panels and organic EL panels.

As a technique of attaching thin plates such as a display panel, a touch panel and a cover glass, there is known a technique in which an ultraviolet-curing resin is coated on the surface of one thin plate, the other thin plate is laid over the one thin plate, and the resin is cured by ultraviolet irradiation after the resin has spread up to a necessary filling area.

In the meantime, taking into account the suppression of variance in amount of the resin that is coated, or the suppression of bubbles, for instance, it is difficult to restrict the area, where the resin is to be filled, to only a display area (hereinafter referred to as "active area") which displays an image. Consequently, there is a case in which the filling area of resin extends outside the active area and reaches the outer peripheral part of the cover glass, which is covered with, for example, a light-shield layer which hardly passes light. In such a case, in the filling area of resin, an area, where ultraviolet that is necessary for curing does not easily reach, will occur under the light-shield layer. In such an area, it is possible that the spreading of the non-cured resin cannot be suppressed, and the resin protrudes to the outside of the display panel.

In particular, as regards smartphones and tablets, technical development has been promoted for specifications of a "narrow picture frame" that is a market demand, in order to achieve both the reduction in size and the enlargement of an active-area screen and to thereby accomplish their task for uses as mobile equipment. Thus, as regards the display panel, since the width of a peripheral area on the outside of the active area has become narrower, it is more important to stem the spreading of the resin at the peripheral area. The resin protruding to the outside of the display panel becomes a hinder when the display panel is assembled in an electronic device body, and may lead to degradation in quality. Moreover, in a step of removing the protruding resin, the removed resin becomes a contaminant, leading to a factor of degradation in quality.

BRIEF DESCRIPTION OF THE DRAWINGS

FIG. 2 is a cross-sectional view which schematically illustrates a cross section of the display device DSP including the display panel PNL shown in FIG. 1A.

FIG. 3 is a plan view illustrating an example of a cover member CB shown in FIG. 2.

FIG. 4 is a cross-sectional view of a peripheral edge portion of the cover member CB shown in FIG. 3.

FIG. 5 is a view which schematically illustrates an example of transmission spectra of a first color layer 11 and a second color layer 12 of the cover member CB shown in FIG. 4.

FIG. 6 is a plan view illustrating another example of the cover member CB shown in FIG. 2.

FIG. 7 is a cross-sectional view of a peripheral edge portion of the cover member CB shown in FIG. 6.

FIG. 9 is a cross-sectional view which schematically illustrates a cross section of another example of the cover member CB which is applicable to the display DSP of the embodiment.

FIG. 10 is a cross-sectional view which schematically illustrates a cross section of another example of the cover member CB which is applicable to the display DSP of the embodiment.

DETAILED DESCRIPTION

Figure 1A:
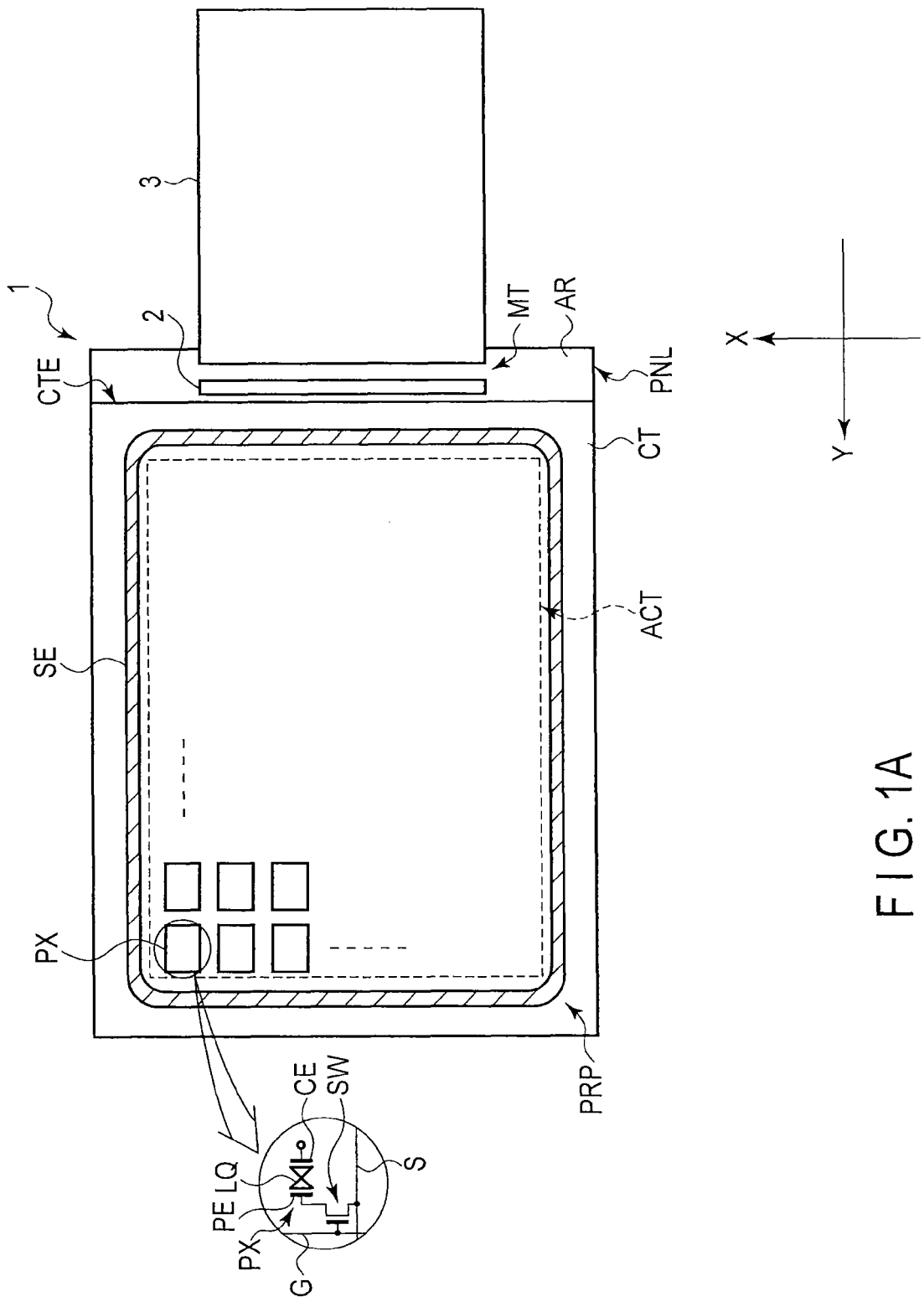
FIG. 1A is a plan view which schematically illustrates an example of a display panel PNL which is applicable to a display device DSP according to an embodiment.

In general, according to one embodiment, a display device includes: a display module including a display area which displays an image; a cover member including a transmissive portion opposed to the display area, a first color portion opposed to a peripheral area on an outside of the display area of the display module, and a second color portion located on an outside of the first color portion; and a photosensitive resin which adheres the display module and the cover member to each other, wherein the first color portion has a higher transmittance of light of a wavelength for curing the photosensitive resin than the second color portion.

According to another embodiment, a cover member disposed to be opposed to a display module including a display area which displays an image, the cover member being adhered to the display module by a photosensitive resin, the cover member includes: a transmissive portion opposed to the display area; a first color portion opposed to a peripheral area on an outside of the display area of the display module; and a second color portion located on an outside of the first color portion, wherein the first color portion has a higher transmittance of light of a wavelength for curing the photosensitive resin than the second color portion.

An embodiment will be described hereinafter with reference to the accompanying drawings. In the drawings, structural elements having the same or similar functions are denoted by like reference numerals, and an overlapping description is omitted.

FIG. 1A is a plan view which schematically illustrates an example of a display panel PNL which is applicable to a display device DSP according to the embodiment. In the description below, a liquid crystal panel will be described as an example of the display panel PNL, but other display panels, such as an organic electroluminescence panel, may be applicable.

Specifically, the display panel PNL is an active-matrix-type liquid crystal panel, and includes an array substrate AR, a counter-substrate CT which is disposed to be opposed to the array substrate AR, and a liquid crystal layer LQ which is held between the array substrate AR and the counter-substrate CT. The array substrate AR and the counter-substrate CT are attached by a sealant SE in a state in which a predetermined cell gap is formed between the array substrate AR and the counter-substrate CT. The cell gap is formed by columnar spacers (not shown) which are formed on the array substrate AR or counter-substrate CT. The liquid crystal layer LQ is held in an inside surrounded by the sealant SE in the cell gap between the array substrate AR and the counter-substrate CT.

The display panel LPN includes an active area ACT, which displays an image, in the inside surrounded by the sealant SE. The active area ACT has, for example, a substantially rectangular shape, and is composed of a plurality of pixels PX which are arrayed in a matrix of m×n (m and n are positive integers).

The array substrate AR includes gate lines G extending in a first direction X, source lines S extending in a second direction Y which is perpendicular to the first direction X, a switching element SW which is electrically connected to the gate line G and source line S, and a pixel electrode PE which is electrically connected to the switching element SW. A counter-electrode CE, which is opposed to each pixel electrode PE via the liquid crystal layer LQ, is provided, for example, on the counter-substrate CT.

Although a description of the detailed structure of the liquid crystal panel is omitted, the display panel is configured such that a mode which mainly uses a vertical electric field, such as a TN (Twisted Nematic) mode, an OCB (Optically Compensated Bend) mode or a VA (Vertical Aligned) mode, or a mode which mainly uses a lateral electric field, such as an IPS (In-Plane Switching) mode or an FFS (Fringe Field Switching) mode, is applicable to the display panel. In the structure in which a mode using a lateral electric field is applied, both the pixel electrode PE and counter-electrode CE are provided on the array substrate AR.

Signal supply sources which are necessary for driving the display panel PNL, such as a driving IC chip 2 and a flexible printed circuit (FPC) board 3, are located on a peripheral area PRP on the outside of the active area ACT. In the example illustrated, the driving IC chip 2 and FPC board 3 are mounted on a mounting portion MT of the array substrate AR, which extends outward from a substrate end portion CTE of the counter-substrate CT.

In the meantime, the above-described display panel PNL may include a touch sensor for sensing a touch of an object on a detection surface, in addition to a function of displaying an image on the active area ACT. Although a description of the details of the touch sensor is omitted, for example, an electrostatic-capacitance method, which detects a variation in electrostatic capacitance of a sensing electrode, is applicable.

Figure 1B:
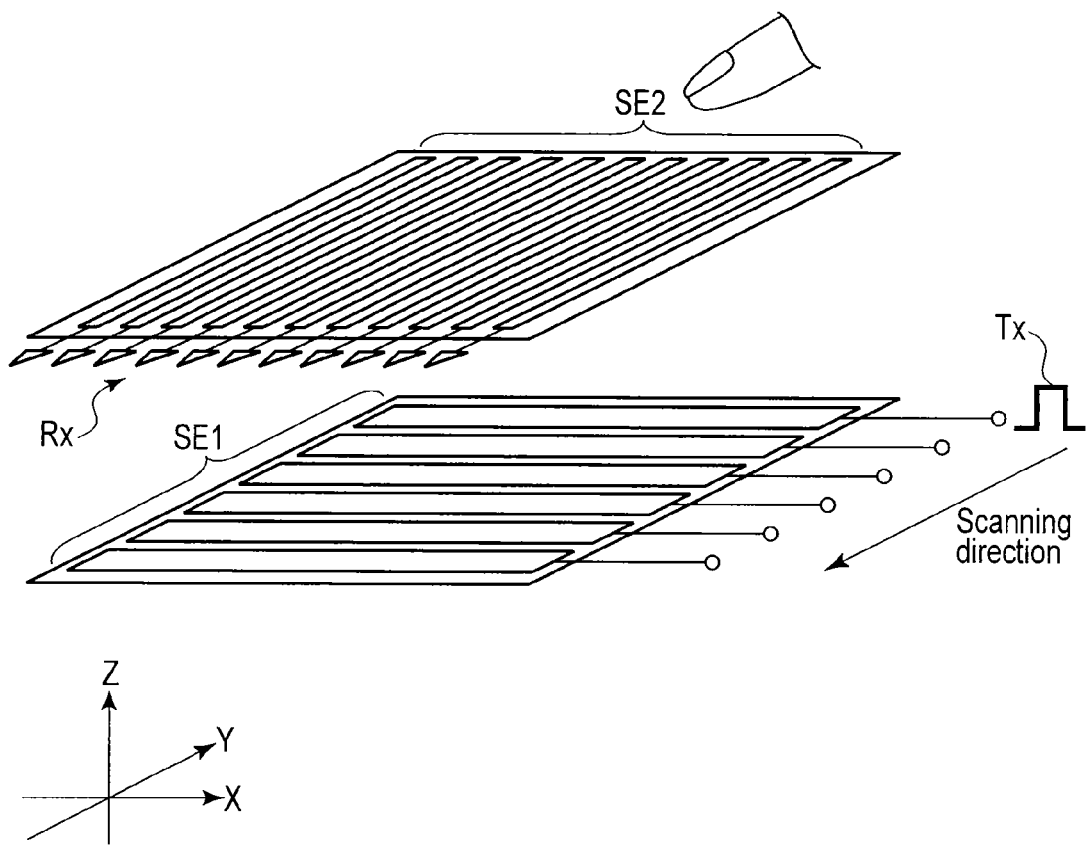
FIG. 1B is a view which schematically illustrates a structure example of a touch sensor TS which is built in the display panel PNL.

FIG. 1B is a view which schematically illustrates a structure example of a touch sensor TS which is built in the display panel PNL.

The touch sensor TS is composed of first detection electrodes SE1 and second detection electrodes SE2 which function as sensing electrodes. For example, a plurality of first detection electrodes SE1 extend in the first direction X and are arranged in the second direction Y. Specifically, the first detection electrodes SE1 are composed of a plurality of segments which are each formed in a strip shape, and sensor driving signals Tx can be individually input to the respective segments. These first detection electrodes SE1 may serve also as wiring lines or electrodes provided on the array substrate AR. For example, the first detection electrodes SE1 may double as the common electrode CE, and common driving signals are input at a time of image display and sensor driving signals are input at a timing of sensing. The first detection electrodes SE1 are formed of a transparent, electrically conductive material, such as ITO (indium tin oxide) or IZO (indium zinc oxide). The second detection electrodes SE2 are spaced apart from the first detection electrodes SE1 in a normal direction Z. A plurality of second detection electrodes SE2 extend in the second direction Y and are arranged in the first direction X. Specifically, the second detection electrodes SE2 are composed of a plurality of segments which are each formed in a strip shape, and sensor detection values Rx can be individually output from the respective segments. These second detection electrodes SE2 are provided, for example, on the counter-substrate CT. The second detection electrodes SE2, together with the first detection electrodes SE1, constitute the touch sensor TS. The second detection electrodes SE2 are formed of a transparent, electrically conductive material, such as ITO or IZO.

FIG. 2 is a cross-sectional view which schematically illustrates a cross section of the display device DSP including the display panel PNL shown in FIG. 1A.

The display device DSP includes a display module MDL which displays an image on the active area ACT, a cover member CB which is disposed to be opposed to the display module MDL, and a photosensitive resin PSR which adheres the display module MDL and the cover member CB to each other. In the example illustrated, the display module MDL includes the display panel PNL shown in FIG. 1A and a backlight BL. Incidentally, the display panel PNL and the backlight BL may be formed integral.

The backlight BL is disposed on the back side of the display panel PNL. Various modes are applicable to the backlight BL. As the backlight BL, use may be made of either a backlight which utilizes a light-emitting diode (LED) as a light source, or a backlight which utilizes a cold cathode fluorescent lamp (CCFL) as a light source. A description of the detailed structure of the backlight BL is omitted.

In the display panel PNL, the liquid crystal layer LQ is held between the array substrate AR and the counter-substrate CT. The array substrate AR and counter-substrate CT are attached by the sealant SE. A detailed description of the structure of the inner surface side of the array substrate AR, which is opposed to the counter-substrate CT, is omitted. A first optical element OD1 including a first polarizer PL1 is attached to an outer surface of the array substrate AR, which is opposed to the backlight BL. The first optical element OD1 is disposed over the entirety of the active area ACT, and also extends to the peripheral area PRP.

Although a detailed description of the structure of the inner surface side of the counter-substrate CT, which is opposed to the array substrate AR, is omitted, a peripheral light-shield layer SHD is formed. The peripheral light-shield layer SHD is formed at a periphery of the active area ACT. Although not described in detail, the peripheral light-shield layer SHD is formed in a rectangular frame shape surrounding the active area ACT. Specifically, the peripheral light-shield layer SHD is disposed at the peripheral area PRP of the display panel PNL. A second optical element OD2 including a second polarizer PL2 is attached to an outer surface of the counter-substrate CT, which is opposed to the cover member CB. The second optical element OD2 is disposed over the entirety of the active area ACT. Further, the second optical element OD2 also extends to the peripheral area PRP, and an end portion of the second optical element OD2 is located at a position overlapping the peripheral light-shield layer SHD.

The cover member CB includes a transmissive portion TR, a first color portion C1 and a second color portion C2. The transmissive portion TR is transparent, and is opposed to the active area ACT of the display module MDL. The first color portion C1 is located on the outside of the transmissive portion TR. The first color portion C1 is opposed to the peripheral area PRP of the display module MDL. The second color portion C2 is located on the outside of the first color portion C1. A concrete structure of the cover member CB will be described later in detail. In the example illustrated, the first color portion C1 neighbors the transmissive portion TR, but another color portion may be interposed between the first color portion C1 and transmissive portion TR.

The colors of the first color portion C1 and second color portion C2 may be black, or other color variations may be adopted. Specifically, the first color portion C1 and second color portion C2 are colored so as to suppress visual recognition of the peripheral area PRP of the display module MDL when the display device is observed from the front surface side of the cover member CB (or so as to prevent light from entering the peripheral area PRP of the display module MDL from the front surface side of the cover member CB).

It is desirable that the hue of the first color portion C1 and the hue of the second color portion C2 be identical. For example, the first color portion C1 and second color portion C2 have a substantially equal reflectance and transmittance with respect to visible light which is incident on the front surface side of the cover member CB. Thus, a boundary between the first color portion C1 and second color portion C2 is hardly visually recognized.

However, the first color portion C1 and second color portion C2 have different transmittances with respect to light of a specific wavelength. Specifically, the first color portion C1 has a higher transmittance than the second color portion C2 with respect to the light of the specific wavelength. In this case, the specific wavelength is the wavelength of light which is radiated in order to cure the photosensitive resin PSR which will be described later. For example, the first color portion C1 has a higher transmittance than the second color portion C2 with respect to light of ultraviolet wavelength.

The photosensitive resin PSR is formed of a transparent material which is cured by irradiation of light of a specific wavelength, for example, an ultraviolet-curing acrylic resin which is cured by irradiation of ultraviolet (e.g. light of a wavelength range of 380 nm or less). The photosensitive resin PSR is interposed between the front surface of the display module MDL and the back surface of the cover member CB. In the example illustrated, on the display module MDL side, the photosensitive resin PSR is in contact with the second optical element OD2. On the cover member CB side, the photosensitive resin PSR is in contact with the transmissive portion TR and the first color portion C1.

An edge PSRE of the photosensitive resin PSR is located at a position opposed to the first color portion C1 of the cover member CB, is located on the outside of the transmissive portion TR, and is located on the inside of the second color portion C2. In addition, the edge PSRE of the photosensitive resin PSR is located in the peripheral area PRP of the display module MDL, is located on the outside of the active area ACT, and is located on the inside (i.e. on the active area side) of an edge MDLE of the display module MDL. Incidentally, a part of the edge PSRE may be located at a position opposed to the second color portion C2.

In the meantime, in the structure including the touch sensor, the outer surface of the cover member CB, that is, that side of the cover member CB, which is opposite to the side facing the display module MDL, corresponds to the detection surface.

FIG. 3 is a plan view illustrating an example of the cover member CB shown in FIG. 2.

The cover member CB has, for example, a rectangular shape having short sides in the first direction X and long sides in the second direction Y. The transmissive portion TR is located at a central part of the cover member CB, and has a rectangular shape corresponding to the shape of the active area ACT. The first color portion C1 corresponds to an area indicated by hatching in an upper right direction in the Figure, and has a frame shape which is continuously formed around the transmissive portion TR. The second color portion C2 corresponds to an area indicated by cross-hatching in the Figure, and has a frame shape which is continuously formed around the color portion C1.

In the example illustrated, the transmissive portion TR is formed in a rectangular shape. In addition, the first color portion C1 is formed in a rectangular frame shape surrounding the transmissive portion TR. The second color portion C2 is formed in a rectangular frame shape surrounding the first color portion C1. Incidentally, the first color portion C1 may be discontinuously formed around the transmissive portion TR.

FIG. 4 is a cross-sectional view of a peripheral edge portion of the cover member CB shown in FIG. 3.

Specifically, the cover member CB is configured to include a transparent substrate 10, a first color layer 11 and a second color layer 12. The substrate 10 is a transparent glass plate or plastic plate, and the thickness thereof is not specified. The substrate 10 may have a relatively thin film shape or a relatively thick planar plate shape. The first color layer 11 is disposed on an inner surface 10A (the side opposed to the display module (not shown)) of the substrate 10 over the first color portion C1 and second color portion C2, and is not disposed in the transmissive portion TR. The second color layer 12 is stacked on the first color layer 11 in the second color portion C2, and is not disposed in the transmissive portion TR and first color portion C1. In the example illustrated, the second color layer 12 is disposed on the display module side of the first color layer 11. The first color layer 11 and second color layer 12 are formed by using such a method as printing, evaporation deposition, or photolithography.

In short, in the transmissive portion TR, neither the first color layer 11 nor the second color layer 12 is disposed. In the first color portion C1, the first color layer 11 is disposed, but the second color layer 12 is not disposed. In the second color portion C2, the first color layer 11 and second color layer 12 are stacked.

In the meantime, the cover member CB may further include a transparent overcoat layer which covers the inner surface 10A of the substrate 10 in the transmissive portion TR, the first color layer 11 in the first color portion C1, and the second color layer 12 in the second color portion C2. The overcoat layer is formed of, for example, a transparent resin, and planarizes asperities on the inner surface 10A, first color layer 11 and second color layer 12.

FIG. 5 is a view which schematically illustrates an example of transmission spectra of the first color layer 11 and second color layer 12 of the cover member CB shown in FIG. 4.

In FIG. 5, the abscissa indicates wavelength (nm), and the ordinate indicates transmittance T. A transmission spectrum t1 of the first color layer 11 exhibits a relatively high transmittance at ultraviolet wavelengths of 380 nm or less, and exhibits a lower transmittance at visible light wavelengths of 380 nm to 780 nm than at the ultraviolet wavelengths. In particular, when the first color layer 11 is black, the transmittance at visible light wavelengths is very low. A transmission spectrum t2 of the second color layer 12 exhibits a relatively low transmittance at the ultraviolet wavelengths of 380 nm or less. At the ultraviolet wavelengths, the transmittance of the first color layer 11 is higher than the transmittance of the second color layer 12.

In this structure, the display device DSP is fabricated, for example, in the following manner. Specifically, a photosensitive resin PSR in a non-cured state (or in a liquid state) is coated on the surface of the display module MDL, that is, on the surface of the second optical element OD2. After the cover member CB is placed on the photosensitive resin PSR, the cover member CB is properly pressurized and the photosensitive resin PSR is spread. After the photosensitive resin PSR is so spread as to cover the entirety of the active area ACT, ultraviolet is radiated on the front surface side of the cover member CB from an ultraviolet-curing light source such as a halogen lamp. The ultraviolet, which has passed through the transmissive portion TR, is radiated on the photosensitive resin PSR which is located in the active area ACT. In addition, the ultraviolet, which has passed through the first color portion C1, is radiated on the photosensitive resin PSR which has spread in the peripheral area PRP. Thereby, the photosensitive resin PSR is cured, and spreading thereof is stemmed. Thus, the edge PSRE is located in the vicinity of a position opposed to the first color portion C1. Even if a part of the photosensitive resin PSR has spread to a position opposed to the second color portion C2, the ultraviolet, which has passed through the first color portion C1, reaches such a part and contributes to curing. It is thus possible to prevent further spreading of the photosensitive resin PSR.

Accordingly, even in the case of a display device DSP of a narrow picture-frame type, or in the case of a display device DSP to which a display module MDL with a narrow peripheral area PRP is applied, the photosensitive resin PSR can be disposed over the entire active area ACT and the spreading of the photosensitive resin PSR to the outside of the peripheral area PRP can be suppressed. Specifically, protrusion of the photosensitive resin PSR to the outside of the display module MDL can be suppressed, and degradation in quality can be suppressed. In addition, a step of removing a protruding resin is needless, the occurrence of a contaminant can be suppressed, and the number of fabrication steps can be reduced. Moreover, there is no need to provide, in addition to the process of radiating ultraviolet on the front surface side of the cover member CB, a new process of radiating ultraviolet on the side surface side or back surface side, thereby to accelerate curing of the non-cured resin, and the manufacturing equipment can be simplified.

Besides, in the cover member CB, the first color layer 11, which has a relatively low transmittance with respect to visible light wavelengths, is disposed over the first color portion C1 and second color portion C2, on the side closer to an observation position. Thus, the boundary between the first color portion C1 and second color portion C2 is hardly visually recognized, and degradation in appearance can be suppressed. In particular, when a first color layer 11, which is black, is applied, light of visible light wavelength hardly passes through the first color layer 11, and therefore the boundary between the first color portion C1 and second color portion C2 is scarcely visually recognized.

Next, other structure examples are described.

FIG. 6 is a plan view illustrating another example of the cover member CB shown in FIG. 2.

The cover member CB of the illustrated example differs from the example shown in FIG. 3 in that the first color portion C1 is formed in a continuous slit shape. Specifically, the cover member CB includes a third color portion C3 between the first color portion C1 and the transmissive portion TR. The third color portion C3 has a frame shape which is continuously formed around the transmissive portion TR. The first color portion C1 is formed between the second color portion C2 and third color portion C3. Incidentally, the first color portion C1 may be formed in a discontinuous slit shape. Besides, the slit-shaped first color portion C1 is not limited to the illustrated example in which the first color portion C1 is formed of a single slit. The first color portion C1 may be formed of a plurality (two or more) of slits.

FIG. 7 is a cross-sectional view of a peripheral edge portion of the cover member CB shown in FIG. 6.

On the inner surface 10A of the substrate 10, the first color layer 11 is disposed over the first color portion C1, second color portion C2 and third color portion C3, and the first color layer 11 is not disposed in the transmissive portion TR. The second color layer 12 is stacked on the first color layer 11 in the second color portion C2 and third color portion C3, and is not disposed in the transmissive portion TR and first color portion C1. In short, in the second color portion C2 and third color portion C3, the first color layer 11 and second color layer 12 are stacked.

Also in the case where the cover member CB of this structure example is applied, the same advantageous effects as with the above-described structure example can be obtained.

Figure 8:
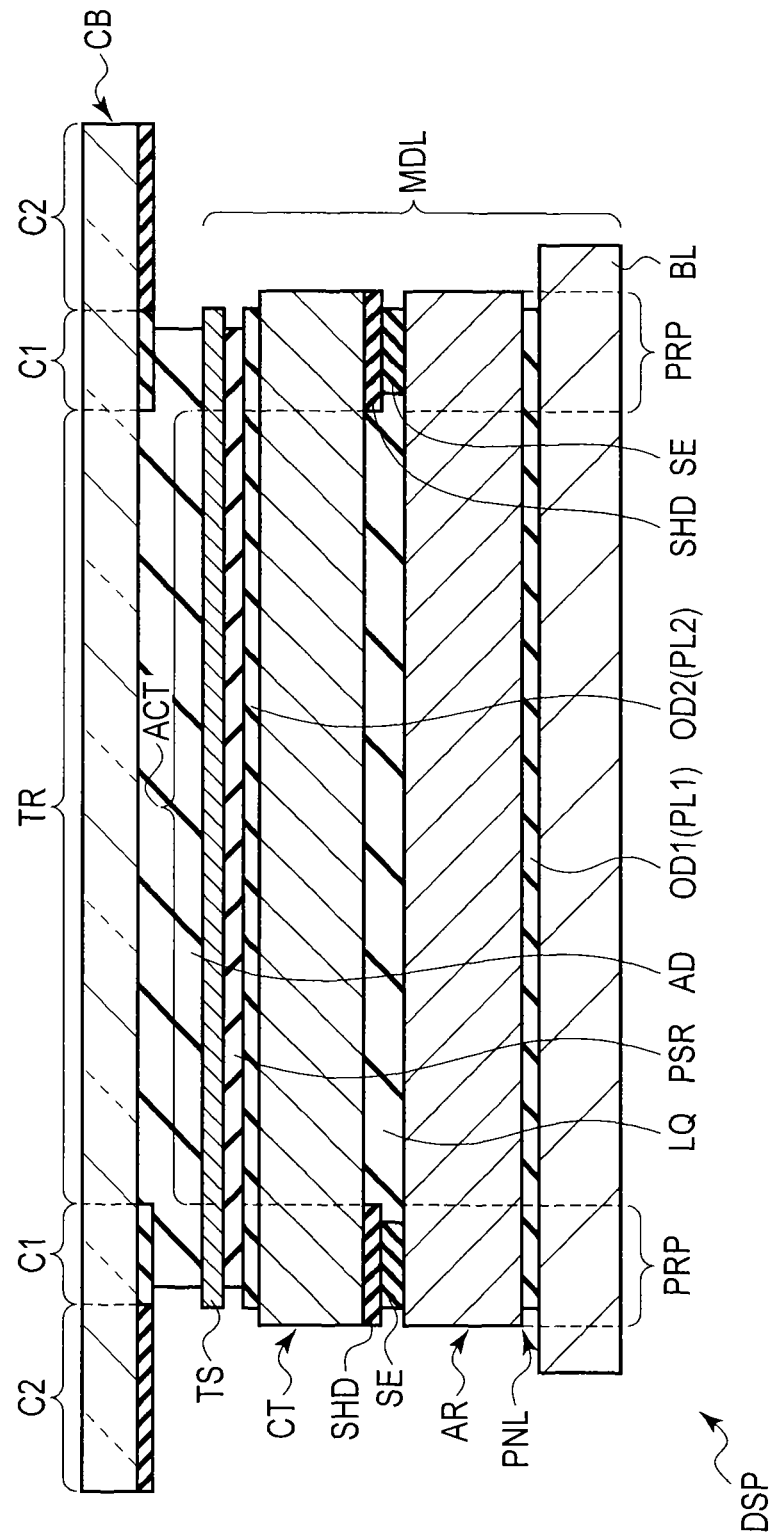
FIG. 8 is a cross-sectional view which schematically illustrates a cross section of another example of the display device DSP including the display panel PNL shown in FIG. 1A.

FIG. 8 is a cross-sectional view which schematically illustrates a cross section of another example of the display device DSP including the display panel PNL shown in FIG. 1A.

The display device DSP of the illustrated example differs from the above-described display device DSP in that a touch sensor TS is provided between the display module MDL and the cover member CB.

Although a detailed description of the touch sensor TS is omitted, sensing electrodes which are formed of a transparent, electrically conductive material (e.g., ITO) are provided on a transparent support substrate such as a glass substrate or a resin substrate, and the touch sensor TS is formed in a shape of a transparent planar plate. The touch sensor TS is opposed, for example, to the entirety of the active area ACT. The touch sensor TS is attached to the display module MDL side of the cover member CB by an adhesive AD.

The photosensitive resin PSR is interposed between the surface of the display module MDL (i.e. the front surface of the second optical element PD2) and the touch sensor TS.

As regards the fabrication method of the display device DSP, for example, after the touch sensor TS is attached to the cover member CB by the adhesive AD, the touch sensor TS is attached to the display panel PNL by the photosensitive resin PSR. However, after the touch sensor TS is attached to the display panel PNL, the touch sensor TS may be attached to the cover member CB.

Also in the case where the display module MDL of this structure example is applied, the same advantageous effects as with the above-described structure example can be obtained.

FIG. 9 is a cross-sectional view which schematically illustrates a cross section of another example of the cover member CB which is applicable to the display DSP of the embodiment.

The cover member CB of the illustrated example is configured to include a transparent substrate 10, a first color layer 11, a second color layer 12 and a touch sensor 13. The transparent substrate 10, first color layer 11 and second color layer 12 are the same as those described above, and a description thereof is omitted here. The touch sensor 13 includes, for instance, sensing electrodes which are formed of a transparent, electrically conductive material (e.g., ITO). The touch sensor 13 is provided, for example, on the display module side of the substrate 10. The touch sensor 13 is disposed in the transmissive portion TR. In the transmissive portion TR, the touch sensor 13 is formed on the inner surface 10A of the substrate 10. In addition, the touch sensor 13 overlaps the first color layer 11 in the first color portion C1, and overlaps the second color layer 12 in the second color portion C2, and the sensing electrodes, etc. are led out to the periphery of the cover member CB. Although not shown, the cover member CB may further include a transparent overcoat layer for covering the touch sensor 13, etc.

Also in the case where the cover member CB of this structure example is applied, the same advantageous effects as with the above-described structure example can be obtained.

FIG. 10 is a cross-sectional view which schematically illustrates a cross section of another example of the cover member CB which is applicable to the display DSP of the embodiment.

The cover member CB of the illustrated example is configured to include a first substrate 101 which is transparent and has a touch sensor 13 provided on the display module side thereof, and a second substrate 102 which is transparent and has a first color layer 11 and a second color layer 12 provided on the display module side thereof. For example, the first substrate 101 is a glass substrate with a relatively thick planar plate shape, and the second substrate 102 is a film having a less thickness than the first substrate 101. The touch sensor 13 is formed on an inner surface 101A of the first substrate 101. An outer surface of the first substrate 101, which is opposite to the touch sensor 13, is opposed to the second substrate 102, and the first substrate 101 and second substrate 102 are attached by an adhesive 103.

Also in the case where the cover member CB of this structure example is applied, the same advantageous effects as with the above-described structure example can be obtained.

As has been described above, according to the present embodiment, it is possible to provide a display device and a cover member, which can suppress degradation in quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display module including a display area which displays an image;
a cover member including a transmissive portion opposed to the display area, a first color portion opposed to a peripheral area on an outside of the display area of the display module, and a second color portion located on an outside of the first color portion; and
a photosensitive resin which adheres the display module and the cover member to each other,
wherein the cover member includes a transparent substrate, a first color layer disposed over the first color portion and the second color portion on a side of the substrate, which is opposed to the display module, and a second color layer stacked below the first color layer in the second color portion,
the first color portion has a higher transmittance of light of a wavelength for curing the photosensitive resin than the second color portion,
the photosensitive resin is an ultraviolet-curing resin,
the first color layer has a higher transmittance than the second color layer with respect to light of ultraviolet wavelength, and
the first color layer has a lower transmittance than the second color layer with respect to visible light wavelengths.

2. The display device of claim 1, wherein an edge of the photosensitive resin is located at a position opposed to the first color portion.

3. The display device of claim 2, wherein an edge of the photosensitive resin is located on the display area side of an edge of the display module.

4. The display device of claim 1, wherein the first color portion has a frame shape which is continuously formed around the transmissive portion.

5. The display device of claim 1, wherein the display module includes a display panel which incorporates a touch sensor.

6. The display device of claim 1, further comprising a touch sensor between the display module and the cover member.

7. The display device of claim 1, wherein the cover member includes a touch sensor on the display module side.

8. The display device of claim 1, further comprising an optical element between the display module and the photosensitive resin,
wherein an edge of the photosensitive resin is located on the display area side of an edge of the optical element.

9. A cover member disposed to be opposed to a display module including a display area which displays an image, the cover member being adhered to the display module by a photosensitive resin, the cover member comprising:
a transmissive portion opposed to the display area;
a first color portion opposed to a peripheral area on an outside of the display area of the display module; and
a second color portion located on an outside of the first color portion,
wherein the cover member includes a transparent substrate, a first color layer disposed over the first color portion and the second color portion on a side of the substrate, which is opposed to the display module, and a second color layer stacked below the first color layer in the second color portion,
the first color portion has a higher transmittance of light of a wavelength for curing the photosensitive resin than the second color portion,
the photosensitive resin is an ultraviolet-curing resin,
the first color layer has a higher transmittance than the second color layer with respect to light of ultraviolet wavelength, and
the first color layer has a lower transmittance than the second color layer with respect to visible light wavelengths.

10. The cover member of claim 9, wherein the first color portion has a frame shape which is continuously formed around the transmissive portion.

11. The cover member of claim 9, further comprising a touch sensor.

12. The cover member of claim 11, wherein the touch sensor is attached to a side of the substrate, which is opposed to the display module.

13. The cover member of claim 11, wherein the touch sensor is formed on an inner surface of the substrate, which is opposed to the display module.

\* \* \* \* \*